United States Patent
Chung et al.

(10) Patent No.: US 9,738,270 B1
(45) Date of Patent: Aug. 22, 2017

(54) APPARATUS AND METHOD FOR CONTROLLING ENGINE CLUTCH OF HYBRID VEHICLE

(71) Applicant: Hyundai Motor Company, Seoul (KR)

(72) Inventors: Kwonchae Chung, Seoul (KR); Sang Joon Kim, Seoul (KR); Young Chul Kim, Seoul (KR); Seong Ik Park, Seoul (KR); WooSuk Choi, Gyeonggi-do (KR); Il Kwon Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/259,140

(22) Filed: Sep. 8, 2016

(30) Foreign Application Priority Data

Apr. 18, 2016 (KR) .......................... 10-2016-0047087

(51) Int. Cl.
| | |
|---|---|
| *B60W 20/00* | (2016.01) |
| *B60W 20/20* | (2016.01) |
| *B60K 6/26* | (2007.10) |
| *B60K 6/38* | (2007.10) |
| *B60K 6/442* | (2007.10) |
| *F02N 11/04* | (2006.01) |
| *F02N 11/08* | (2006.01) |

(52) U.S. Cl.
CPC ............... *B60W 20/20* (2013.01); *B60K 6/26* (2013.01); *B60K 6/38* (2013.01); *B60K 6/442* (2013.01); *F02N 11/04* (2013.01); *F02N 11/0851* (2013.01); *B60K 2006/268* (2013.01)

(58) Field of Classification Search
CPC ......... B60K 6/26; B60W 20/20; B60W 20/00; B60W 10/08; B60W 10/02
See application file for complete search history.

(56) References Cited

U.S. PATENT DOCUMENTS

| | | | | |
|---|---|---|---|---|
| 9,233,686 B2 * | 1/2016 | Park | ...................... | B60W 20/40 |
| 9,371,069 B2 * | 6/2016 | Kim | ...................... | B60W 10/06 |
| 9,475,489 B2 * | 10/2016 | Kim | ...................... | B60W 20/40 |

FOREIGN PATENT DOCUMENTS

| | | |
|---|---|---|
| JP | 4196915 B2 | 12/2008 |
| JP | 2014-234133 A | 12/2014 |
| KR | 10-1558376 B1 | 10/2015 |

\* cited by examiner

*Primary Examiner* — John Walters
*Assistant Examiner* — James Triggs
(74) *Attorney, Agent, or Firm* — Mintz Levin Cohn Ferris Glovsky and Popeo, P.C.; Peter F. Corless

(57) ABSTRACT

An engine clutch control apparatus of a hybrid vehicle is provided. The apparatus includes an engine clutch that is disposed between an engine and a drive motor to selectively connect the engine and the drive motor and an integrated starter-generator that is connected with the engine to start the engine or to generate electricity. A vehicle controller releases or couples the engine clutch to implement a driving mode and determines a chargeable torque and an engine target estimation torque based on a generator rotation speed of the integrated starter-generator. An engine target torque and a charge torque are set based on the chargeable torque and a clutch input torque is generated using at least one of the engine target torque, an engine friction torque, and the charge torque. The engine clutch is then released when the clutch input torque is less than a reference value.

15 Claims, 4 Drawing Sheets

APPARATUS AND METHOD FOR CONTROLLING ENGINE CLUTCH OF HYBRID VEHICLE

CROSS-REFERENCE TO RELATED APPLICATION

This application claims priority to and the benefit of Korean Patent Application No. 10-2016-0047087 filed in the Korean Intellectual Property Office on Apr. 18, 2016, the entire contents of which are incorporated herein by reference.

BACKGROUND (a) Field of the Invention

The present invention relates to an engine clutch control apparatus of a hybrid vehicle, and more particularly, to an apparatus and method for controlling an engine clutch of a hybrid vehicle that controls release of the engine clutch by calculating a clutch input torque of the engine clutch based on a charge torque of an integrated starter-generator.

(b) Description of the Related Art

Today, as an environment pollution concerns increase, use of pollution free energy has been more actively researched. Particularly, the exhaust gas from a vehicle is a contributor to air pollution in larger cities. Accordingly, to provide enhancement of fuel consumption and reduce exhaust gas, a hybrid vehicle has been developed.

Particularly, a hybrid vehicle uses power generated with an engine and a motor and is driven by appropriately using of the power generated by a combustion operation of the engine and power generated by a rotation of the motor using electrical energy that is stored at a battery. In the hybrid vehicle, a transmission mounted electric device (TMED) type transmission in which a drive motor and a transmission are connected is generally applied. In addition, to transfer power of the engine to a drive shaft, an engine clutch is mounted between the engine and the drive motor.

The hybrid vehicle may be driven in various driving modes such as an electric vehicle (EV) mode, which is a pure electric vehicle mode using power of a drive motor based on whether an engine clutch is coupled, a hybrid electric vehicle (HEV) mode using a torque of a motor as auxiliary power while using a torque of an engine as main power, and a regenerative braking (RB) mode that recovers energy and charges the battery using the energy by enabling the motor to generate electricity with braking and inertia energy upon driving by braking or inertia of the vehicle.

In other words, while driving in an EV mode, when a driver's request power is greater than motor power, the hybrid vehicle performs a control that couples the engine clutch to connect the engine and the motor. Further, when the driver disengages an accelerator pedal or when the hybrid vehicle may be driven with only motor power due to the minimal request power, the hybrid vehicle performs a control that releases the engine clutch. The engine clutch is released based on a clutch input torque of the engine clutch. However, since the clutch input torque may be inaccurate, when the engine clutch is released, while the clutch input torque is transferred to a drive shaft, sense of difference by torque cutoff occurs.

The above information disclosed in this section is merely for enhancement of understanding of the background of the invention and therefore it may contain information that does not form the prior art that is already known in this country to a person of ordinary skill in the art.

SUMMARY

The present invention provides an apparatus and method for controlling an engine clutch of a hybrid vehicle having advantages of being capable of releasing the engine clutch by adjusting a clutch input torque of the engine clutch when an HEV mode is converted to an EV mode. The present invention also provides an apparatus and method for controlling an engine clutch of a hybrid vehicle having advantages of being capable of controlling release of the engine clutch by calculating a clutch input torque of the engine clutch based on a charge torque of an integrated starter-generator.

An exemplary embodiment of the present invention provides an engine clutch control apparatus of a hybrid vehicle that may include: an engine clutch disposed between an engine and a drive motor to selectively connect the engine and the drive motor; an integrated starter-generator connected with the engine to start the engine or to generate electricity; and a vehicle controller configured to release or couple the engine clutch to implement a driving mode, wherein the vehicle controller may be configured to determine a chargeable torque and an engine target estimation torque based on a generator rotation speed of the integrated starter-generator, set an engine target torque and a charge torque based on the chargeable torque, generate a clutch input torque using at least one of the engine target torque, an engine friction torque, and the charge torque, and release the engine clutch, when the clutch input torque is less than a reference value.

Another exemplary embodiment of the present invention provides a method of controlling an engine clutch of a hybrid vehicle that may include: determining a chargeable torque based on a generator rotation speed of an integrated starter-generator, when an engine stops or enters in an EV mode; determining an engine target estimation torque based on the generator rotation speed; setting at least one of an engine target torque and a charge torque based on the chargeable torque; calculating a clutch input torque using at least one of the engine target torque, an engine friction torque, and the charge torque; and releasing the engine clutch, when the clutch input torque is less than a reference value.

In an exemplary embodiment of the present invention, when an HEV mode is converted to an EV mode, by adjusting a clutch input torque of an engine clutch, the engine clutch may be released and thus engine clutch release may be more rapidly performed and sense of difference by torque cutoff may be minimized. Further, by calculating a clutch input torque of an engine clutch based on a charge torque of an integrated starter-generator, release of the engine clutch may be controlled and thus fuel consumption may be reduced, fuel consumption may be improved, and drivability may be improved.

In addition, an effect that may be obtained or estimated due to an exemplary embodiment of the present invention is directly or implicitly described in a detailed description of an exemplary embodiment of the present invention. That is, various effects that are estimated according to an exemplary embodiment of the present invention will be described within a detailed description to be described later.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
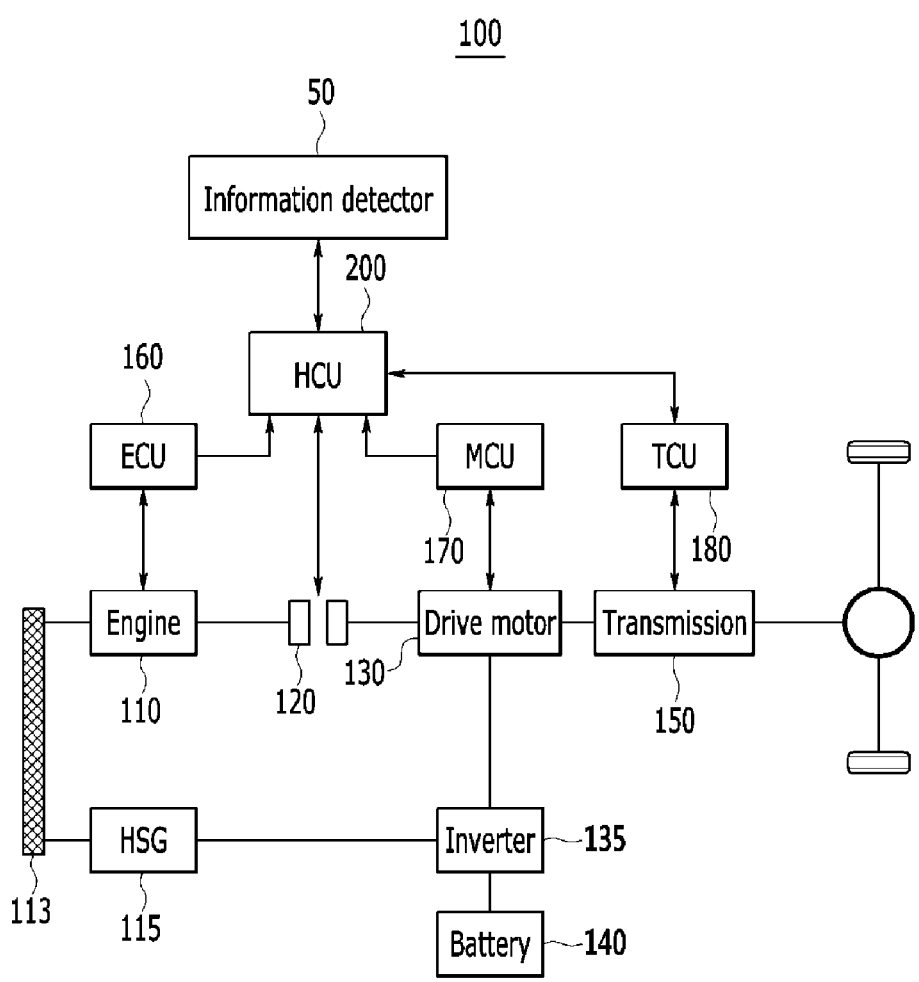
FIG. 1 is a diagram illustrating an engine clutch control apparatus of a hybrid vehicle according to an exemplary embodiment of the present.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an operation principle of an apparatus and method for controlling an engine clutch of a hybrid vehicle according to an exemplary embodiment of the present invention will be described in detail with reference to the accompanying drawings and description. However, drawings shown hereinafter and a detailed description to be described later relate to an exemplary embodiment among several exemplary embodiments for effectively describing a characteristic of the present invention. Therefore, the present invention is not limited to only the following drawing and description.

Detailed descriptions of well-known functions and structures incorporated herein may be omitted to avoid obscuring the subject matter of the present invention. The terms used herein are defined in consideration of functions of the present invention and may vary depending on a user's or an operator's intension and usage. Therefore, the terms used herein should be understood based on the descriptions made herein. Further, the following exemplary embodiment may use terms by appropriately changing, integrating, or separating to be clearly understood by a person of ordinary skill in the art in order to efficiently describe a core technical characteristic of the present invention, but the present invention is not limited thereto.

Hereinafter, an exemplary embodiment of the present invention will be described in detail with reference to the accompanying drawings. FIG. 1 is a diagram illustrating an engine clutch control apparatus of a hybrid vehicle according to an exemplary embodiment of the present. Referring to FIG. 1, an engine clutch control apparatus 100 (hereinafter, referred to as an 'engine clutch control apparatus') of the hybrid vehicle may include an information detector 50, an engine 110, a hybrid starter & generator (HSG) 115, an engine clutch 120, a drive motor 130, an inverter 135, a battery 140, a transmission 150, an engine control unit 160 (hereinafter, referred to as an 'ECU' or controller), a motor control unit 170 (hereinafter, referred to as an 'MCU' or motor controller), a transmission control unit 180 (hereinafter, referred to as a 'TCU' or transmission controller), and a hybrid control unit 200 (hereinafter, referred to as an 'HCU' or hybrid controller). The various components of the system may all be operated by a controller having a processor and a memory. The controller may be an upper or integrated controller.

In power delivery of the hybrid vehicle, power generated in the engine 110 or the drive motor 130 may be selectively transferred to an input shaft of the transmission 150, and power output from an output terminal of the transmission 150 may be transferred to an axle via a differential gear device. As the axle rotates a wheel, the hybrid vehicle may be driven by power generated in the engine 110 or the drive motor 130. The information detector 50 (e.g., various sensors) may be configured to detect information for operating the engine clutch 120 and provide the detected information to the HCU 200. For example, when the hybrid vehicle is driven, the information detector 50 may be configured to detect vehicle state information including an engine speed of the engine 110, a generator rotation speed of the HSG 115, a motor rotation speed of the drive motor 130, a vehicle speed, an engagement value or degree of an accelerator pedal (e.g., how much pressure is exerted onto the pedal), and engagement value or degree of a brake pedal (e.g., how much pressure is exerted onto the pedal).

The engine 110 burns fuel to generate power. In other words, for the engine 110, various known engines 110 such as a gasoline engine or a diesel engine using existing fossil fuel may be used. An output of the engine 110 may be adjusted by the ECU 160, and driving of the engine 110 may be executed to an optimal driving point by the ECU 160. The HSG 115 may be connected with the engine 110. In other words, the HSG 115 may be connected with the engine 110 via a belt 113. The HSG 115 may be configured to start the engine 110 or in a state in which the engine 110 is started, the HSG 115 may be configured to operate as a generator to generate electrical energy.

The drive motor 130 may be operated by a three phase alternating current (AC) voltage applied from the MCU 170 to generate a torque. The drive motor 130 may be configured to operate as a generator upon coasting or regenerative braking to supply a voltage to the battery 140. The inverter 135 may be configured to supply a current to the drive motor 130 and the HSG 115. In other words, the inverter 135 may be configured to supply a current to the drive motor 130 and the HSG 115 or stop current supply according to the control of the MCU 170. The engine clutch 120 may be disposed between the engine 110 and the drive motor 130 and may be operated by the HCU 200 to connect or disconnect power delivery between the engine 110 and the drive motor 130. In other words, the engine clutch 120 may be configured to connect or disconnect power between the engine 110 and the drive motor 130 based on a switch between an electric vehicle (EV) mode and a hybrid electric vehicle (HEV) mode.

Additionally, the battery 140 may be formed with a plurality of unit cells, and at the battery 140, a high voltage for providing a driving voltage to the drive motor 130 may be stored. The battery 140 may be configured to supply a driving voltage to the drive motor 130 in an EV mode or an HEV mode and may be charged with a voltage generated in the drive motor 130 upon regenerative braking. When commercial power is plug-in connected, the battery 140 may be charged by a voltage and a current by a charge device.

The transmission 150 may be configured to adjust a shift ratio according to the control of the HCU 200 and distribute an output torque added and applied through the engine clutch 120 based on a driving mode with a shift ratio to transfer the distributed output torque to a driving wheel, thereby enabling the vehicle to drive. For the transmission 150, an automatic transmission or a continuously variable transmission may be applied. Additionally, for the transmission 150, a multistage transmission may be applied. In other words, the transmission 150 may be formed with a plurality of gear shift stages.

The ECU 160 may be connected with the HCU 200 via a network and may be interlocked with the HCU 200 to execute general operations of the engine 110 based on an operation state of the engine 110 such as a driver's demand torque signal, a coolant temperature, and an engine torque. The ECU 160 may be configured to provide or transmit an operation state of the engine 110 to the HCU 200. The MCU 170 may be configured to drive and adjust torque of the drive motor 130 according to the control of the HCU 200 and store electricity generated in the drive motor 130 at the battery 140 upon regenerative braking.

The MCU 170 may be configured to apply a three phase AC voltage to the drive motor 130 and the HSG 115. The TCU 180 may be configured to adjust a shift ratio based on each output torque of the ECU 160 and the MCU 170 and execute general operations of the transmission 150 such as determination of a regenerative braking amount. The TCU 180 may be configured to transmit or provide an operation state of the transmission 150 to the HCU 200. The HCU 200 may be an uppermost controller configured to execute hybrid driving mode setting and general operations of an environmentally-friendly vehicle. The HCU 200 may be configured to integrally operate subordinate control units that are connected via a control unit area network (CAN) communication network, collect and analyze information of each subordinate control unit (e.g., detect states or values from the information), execute a cooperation control, and adjust an output torque of the engine 110 and the drive motor 130.

When the engine stops starting or enters from the HEV mode to the EV mode, the HCU 200 may be configured to determine a chargeable torque and an engine target estimation torque based on a generator rotation speed of the HSG 115. The chargeable torque may represent an estimated value of a torque that may charge at the HSG 115, and the engine target estimation torque may represent a target torque estimation value of the engine 110 based on the generator rotation speed. The HCU 200 may be configured to set an engine target torque and a charge torque based on a chargeable torque and generate a clutch input torque using at least one of the engine target torque, an engine friction torque, and a charge torque. The clutch input torque may represent a torque input to the engine clutch.

When a clutch input torque is less than a reference value, the HCU 200 may be configured to release the engine clutch. In particular, the reference value is a value used to determine when to release the engine clutch and may be set by an operator or may be set through predetermined algorithm (e.g., program and probability model). The HCU 200 may be implemented into at least one processor operating by a predetermined program, and the predetermined program includes a series of instructions for performing each step that is included in a method of controlling or operating an engine clutch according to an exemplary embodiment of the present invention to be described later. Such a method of controlling an engine clutch will be described in detail with reference to FIGS. 2 and 3. In a vehicle according to the present invention including the function, a common operation is executed equally to or similarly with that of a conventional vehicle and therefore a detailed description thereof will be omitted.

Figure 2:
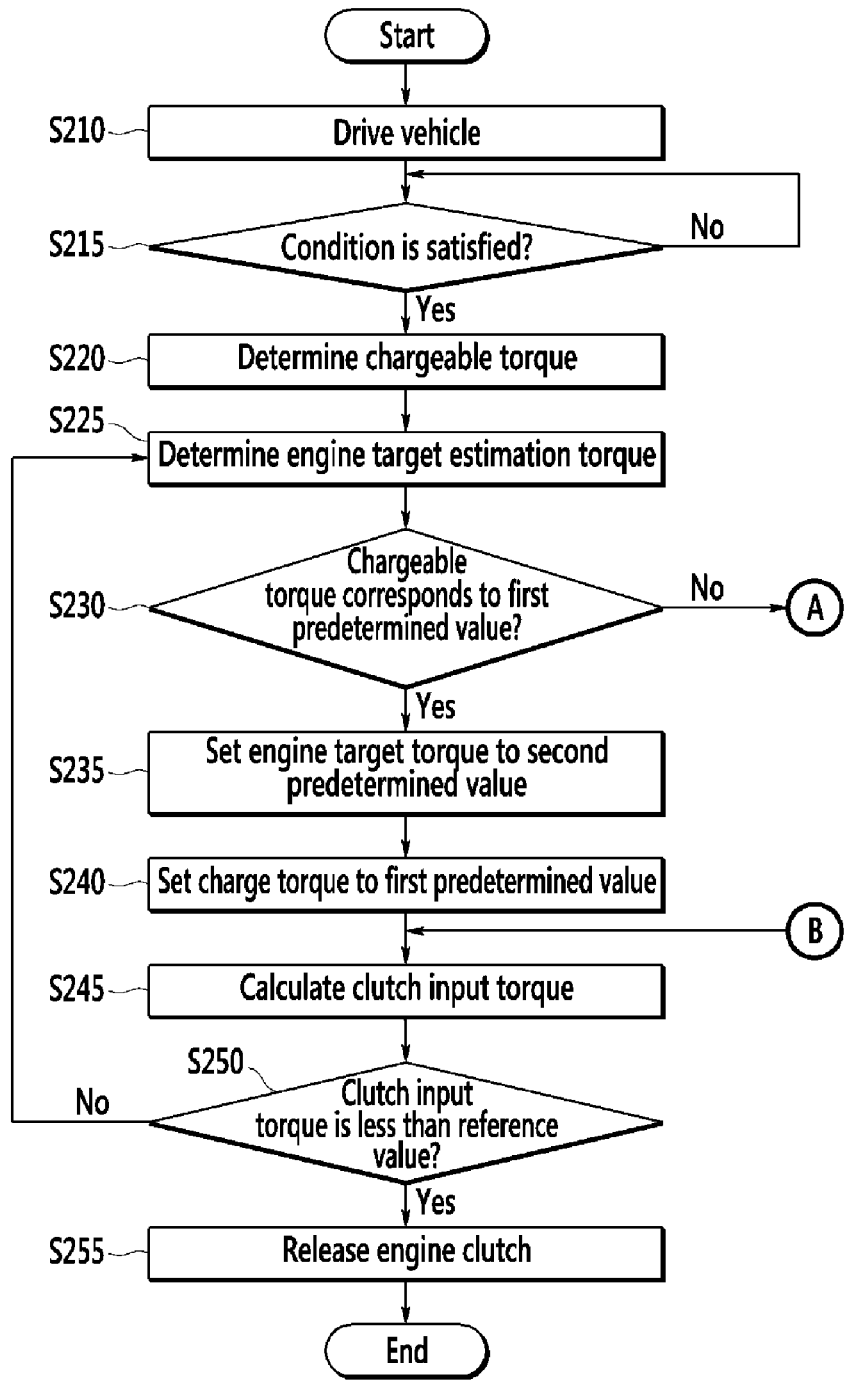
FIGS. 2 and 3 are flowcharts illustrating a method of controlling an engine clutch of a hybrid vehicle according to an exemplary embodiment of the present invention.
Figure 3:
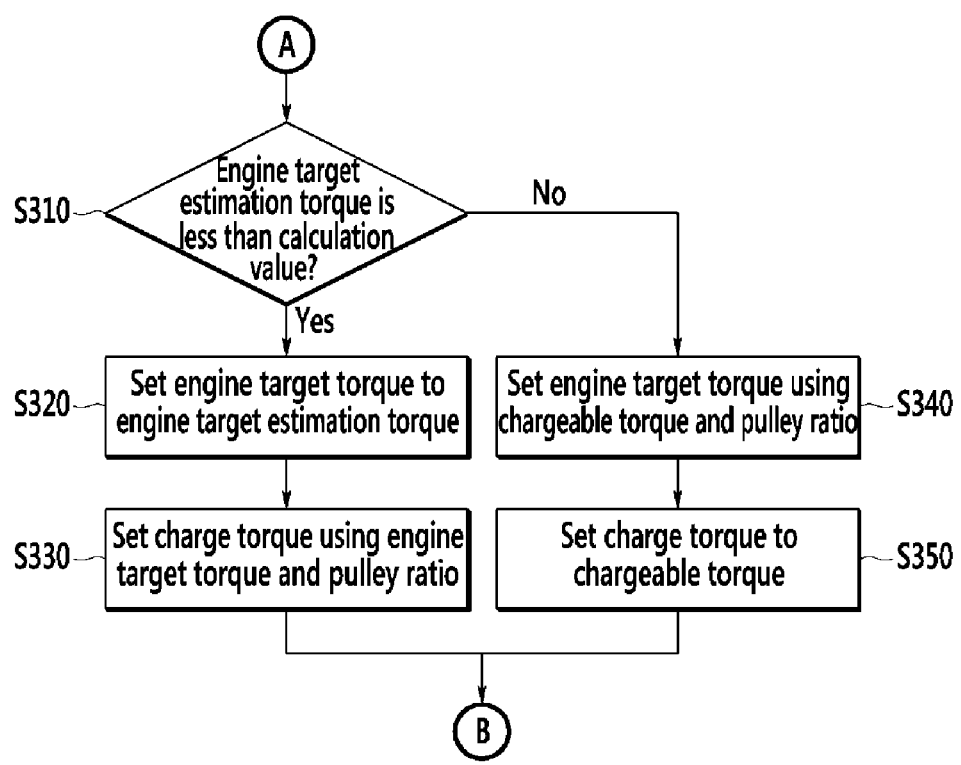

FIGS. 2 and 3 are flowcharts illustrating a method of controlling an engine clutch of a hybrid vehicle according to an exemplary embodiment of the present invention. Various controllers of the engine clutch control apparatus 100 of the hybrid vehicle according to an exemplary embodiment of the present invention that is described with reference to FIG. 1 may be integrated or subdivided, and controllers that perform the above-described function regardless of a corresponding name may be a constituent element of the engine clutch control apparatus 100 of the hybrid vehicle according to an exemplary embodiment of the present invention. Hereinafter, when describing a method of controlling the engine clutch 120 in the engine clutch control apparatus 100 of the hybrid vehicle according to an exemplary embodiment of the present invention, a subject of each step is the engine clutch control apparatus 100 instead of corresponding controllers and the engine clutch control apparatus 100 will be mainly described.

Referring to FIGS. 2 and 3, when a vehicle is started by a driver's demand, the engine clutch control apparatus 100 may be configured to drive the vehicle (S210). The engine clutch control apparatus 100 may be configured to detect vehicle state information using various sensors mounted within the vehicle. Such vehicle state information may include a vehicle speed, a gear shift stage, an engagement degree of an accelerator pedal, an engagement degree of a brake pedal, a generator rotation speed, and an engine speed of the hybrid vehicle.

The engine clutch control apparatus 100 may be configured to determine whether a condition for releasing the engine clutch 120 is satisfied (S215). In other words, the engine clutch control apparatus 100 may be configured to determine whether a condition for releasing the engine clutch 120 is satisfied based on vehicle state information. For example, the engine clutch control apparatus 100 may be configured to determine whether to convert from an HEV mode to an EV mode and whether the engine 110 is stopped based on vehicle state information. When a condition for releasing the engine clutch 120 is not satisfied, the process returns to step S215 and the engine clutch control apparatus 100 may be configured to monitor whether a condition for releasing the engine clutch 120 is satisfied. When a condition for releasing the engine clutch 120 is satisfied, the engine clutch control apparatus 100 may be configured to determine a chargeable torque (S220). In other words, when a condition for releasing the engine clutch 120 is satisfied, the engine clutch control apparatus 100 may be configured to determine a generator rotation speed and determined a chargeable torque of the HSG 115 based on the generator rotation speed.

The engine clutch control apparatus 100 may further be configured to determine an engine target estimation torque (S225). Specifically, the engine clutch control apparatus 100 may be configured to determine an engine speed based on the generator rotation speed and determine an engine target estimation torque based on the engine speed. In other words, the engine clutch control apparatus 100 may be configured to set or generate a predetermined table in which an engine target estimation torque may be matched to each of a plurality of engine speeds (e.g., a table or map may be prestored in the memory of the controller). The engine clutch control apparatus 100 may be configured to access the table to extract and determine an engine target estimation torque that corresponds to the engine speed at a predetermined table.

The engine clutch control apparatus 100 may be configured to determine whether a chargeable torque corresponds to a first predetermined value (S230). In other words, the engine clutch control apparatus 100 may be configured to determine whether the chargeable torque determined at step S220 corresponds to a first predetermined value. Particularly, the first predetermined value is a preset value and may be 0. When a chargeable torque corresponds with a first predetermined value, the engine clutch control apparatus 100 may be configured to set an engine target torque to a second predetermined value (S235). In particular, the second predetermined value is a preset value and may be 0. In other words, when the chargeable torque corresponds with 0, the engine clutch control apparatus 100 may be configured to set an engine target torque to 0.

The engine clutch control apparatus 100 may be configured to set a charge torque to a first predetermined value (S240). In other words, since the chargeable torque is 0, the engine clutch control apparatus 100 may be configured to set the charge torque to 0. The engine clutch control apparatus 100 may then be configured to calculate a clutch input torque using the engine target torque, the engine friction torque, the charge torque, and a pulley ratio (S245). In other words, the engine clutch control apparatus 100 may be configured to sum the engine friction torque and the engine target torque set at step S235 to calculate an engine instruction torque. The engine clutch control apparatus 100 may be configured to calculate a clutch input torque using the engine instruction torque, the charge torque set at step S240, the engine friction torque, and a pulley ratio of the engine 110 and the HSG 115. Particularly, the engine friction torque may be a value that is set based on the engine 110. In other words, the engine clutch control apparatus 100 may be configured to calculate a clutch input torque based on Equation 1.

$$Tci = (Teg + Tf)Tf + (Thc*P) \quad \text{Equation 1}$$

wherein Tci represents a clutch input torque, Teg represents an engine target torque, Tf represents an engine friction torque, Thc represents a charge torque, and P represents a pulley ratio.

Furthermore, the engine clutch control apparatus 100 may be configured to determine whether the clutch input torque is less than a reference value (S250). When the clutch input torque is equal to or greater than a reference value, the process may return to step S225 and the engine clutch control apparatus 100 may be configured to determine an engine target estimation torque. When the clutch input torque is less than a reference value, the engine clutch control apparatus 100 may be configured to release the engine clutch 120 (S255). When the chargeable torque does not correspond with a first predetermined value at step S230, the engine clutch control apparatus 100 may be configured to determine whether the engine target estimation torque is less than a calculation value (S310). Particularly, the calculation value may be a value generated by multiplying the chargeable torque and a pulley ratio.

When the engine target estimation torque is less than a calculation value, the engine clutch control apparatus 100 may be configured to set an engine target torque to the engine target estimation torque (S320). In other words, when the engine target estimation torque is less than a calculation value, the engine clutch control apparatus 100 may be configured to set the engine target torque to the engine target estimation torque determined at step S225. The engine clutch control apparatus 100 may be configured to set a charge torque using the engine target torque and a pulley ratio (S330). In other words, the engine clutch control apparatus 100 may be configured to set a charge torque by dividing the engine target torque set at step S320 by a pulley ratio.

Thereafter, the process may return to step S245 and the engine clutch control apparatus 100 may be configured to calculate the clutch input torque. The engine clutch control apparatus 100 may be configured to generate an engine instruction torque using the engine friction torque and the engine target torque set at step S320 and may be configured to calculate a clutch input torque using the engine instruction torque, the engine friction torque, the charge torque set at step S330, and a pulley ratio. When the calculated clutch input torque is less than a reference value at step S250, the engine clutch control apparatus 100 may be configured to release the engine clutch 120.

When the engine target estimation torque is equal to or greater than a calculation value at step S310, the engine clutch control apparatus 100 may be configured to set an engine target torque using the chargeable torque and a pulley ratio (S340). In other words, when the engine target estimation torque is equal to or greater than a calculation value, the engine clutch control apparatus 100 may be configured to set an engine target torque by multiplying the chargeable torque and a pulley ratio. The engine clutch control apparatus 100 may further be configured to set the charge torque to a chargeable torque determined at step S220 (S350).

Thereafter, the process may return to step S245 and the engine clutch control apparatus 100 may be configured to calculate a clutch input torque. In other words, the engine clutch control apparatus 100 may be configured to generate an engine instruction torque by adding the engine friction torque and the engine target torque set at step S340 and may be configured to calculate a clutch input torque by substituting the engine instruction torque, the engine friction torque, the charge torque set at step S350, and a pulley ratio to Equation 1. When the calculated clutch input torque is less than a reference value, the engine clutch control apparatus 100 may be configured to release the engine clutch 120.

Figure 4:
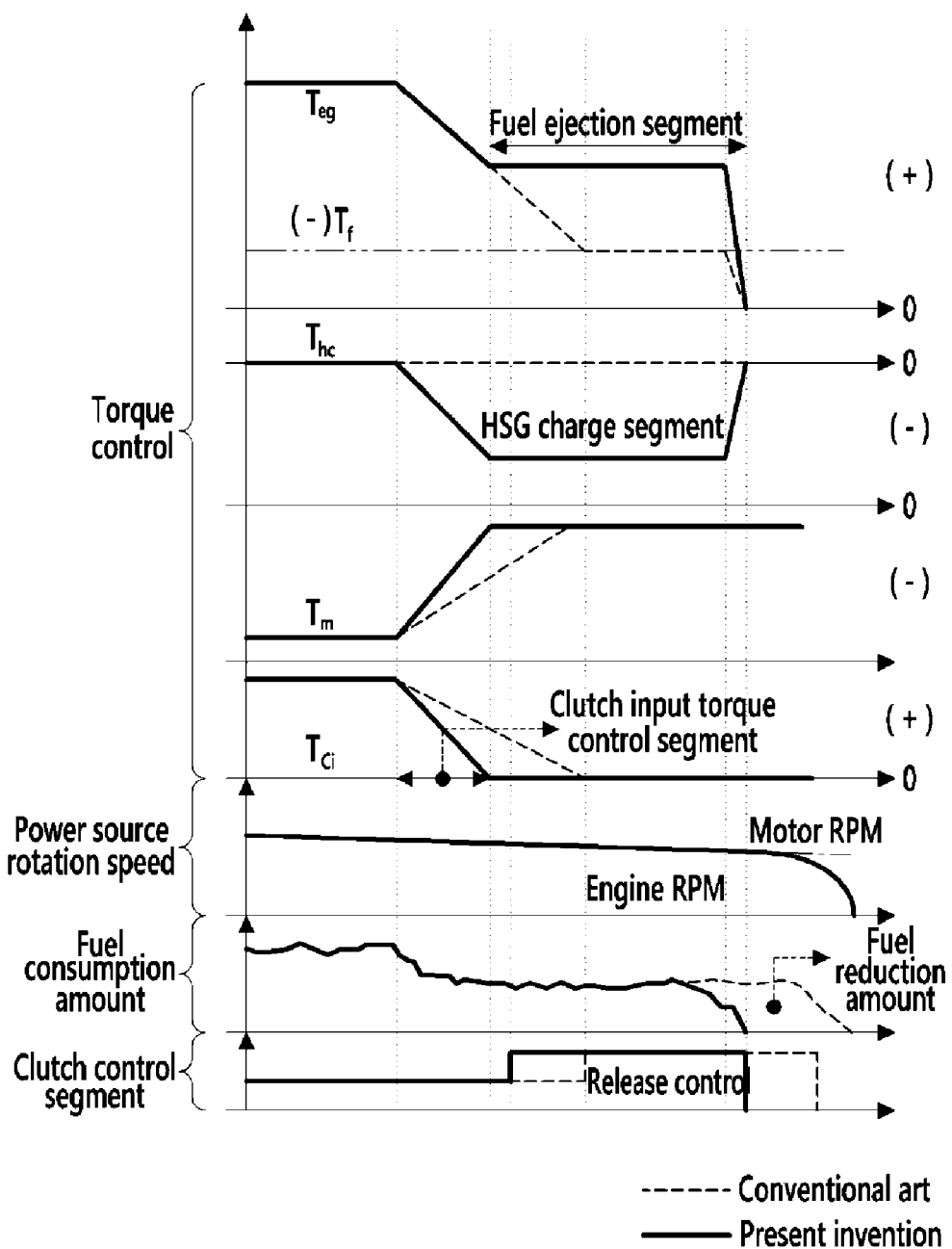
FIG. 4 is a graph illustrating an effect of a method of controlling an engine clutch of a hybrid vehicle according to an exemplary embodiment of the present invention.

Accordingly, since an engine clutch control apparatus of a hybrid vehicle according to the present invention may be configured to calculate a clutch input torque input to an engine clutch using a charge torque and release the engine clutch based on the clutch input torque, a reduction time of the input torque of the engine clutch may be reduced, and an engine clutch release time point and a fuel blocking time point may be rapidly performed, compared with a conventional case. In other words, as shown in FIG. 4, compared with the conventional art that is indicated by a dotted line, in an engine clutch control apparatus according to the present invention that is indicated by a solid line, it may be determined that an engine clutch release control entrance time point and a fuel blocking time point are decreased. Therefore, the engine clutch control apparatus according to the present invention may secure drivability and may obtain a fuel consumption gain by reducing a consumption fuel amount.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

100: engine clutch control apparatus of hybrid vehicle
110: engine
115: HSG
130: drive motor
135: inverter
140: battery
150: transmission
160: ECU
170: MCU
180: TCU
200: HCU

What is claimed is:

1. An engine clutch control apparatus of a hybrid vehicle, comprising:
an engine clutch disposed between an engine and a drive motor to selectively connect the engine and the drive motor;
an integrated starter-generator connected with the engine to start the engine or to generate electricity; and
a vehicle controller configured to release or couple the engine clutch to implement a driving mode,
wherein the vehicle controller is configured to determine a chargeable torque and an engine target estimation torque based on a generator rotation speed of the integrated starter-generator, set an engine target torque and a charge torque based on the chargeable torque, generate a clutch input torque using at least one of the engine target torque, an engine friction torque, and the charge torque, and release the engine clutch, when the clutch input torque is less than a reference value.

2. The engine clutch control apparatus of claim 1, wherein the vehicle controller is configured to generate an engine instruction torque by adding the engine target torque and the engine friction torque and generate a clutch input torque using the engine instruction torque, the engine friction torque, the charge torque, and a pulley ratio of the engine and the integrated starter-generator.

3. The engine clutch control apparatus of claim 1, wherein the vehicle controller is configured to set a second predetermined value to an engine target torque and set the first predetermined value to the charge torque, when the chargeable torque corresponds with a first predetermined value.

4. The engine clutch control apparatus of claim 1, wherein the vehicle controller is configured to generate a calculation value by multiplying a chargeable torque and a pulley ratio, when the chargeable torque does not correspond with a first predetermined value, determine whether the engine target estimation torque is less than the calculation value, and set an engine target estimation torque to an engine target torque, when the engine target estimation torque is less than the calculation value.

5. The engine clutch control apparatus of claim 4, wherein the vehicle controller is configured to generate a charge torque by dividing the engine target torque by a pulley ratio.

6. The engine clutch control apparatus of claim 4, wherein the vehicle controller is configured to set an engine target torque by multiplying the chargeable torque and a pulley ratio and set the chargeable torque to the charge torque, when the engine target estimation torque is equal to or greater than the calculation value.

7. The engine clutch control apparatus of claim 1, wherein the vehicle controller is configured to determine an engine speed based on the generator rotation speed and extract an engine target estimation torque that corresponds to the engine speed in a predetermined table.

8. The engine clutch control apparatus of claim 7, wherein the vehicle controller is configured to set the predetermined table in which an engine target estimation torque corresponds to each of a plurality of engine speeds.

9. A method of controlling an engine clutch of a hybrid vehicle, comprising:
determining, by a controller, a chargeable torque based on a generator rotation speed of an integrated starter-generator, when an engine stops or enters in an electric vehicle (EV) mode;
determining, by the controller, an engine target estimation torque based on the generator rotation speed;
setting, by the controller, at least one of an engine target torque and a charge torque based on the chargeable torque;
calculating, by the controller, a clutch input torque using at least one of the engine target torque, an engine friction torque, and the charge torque; and
releasing, by the controller, the engine clutch when the clutch input torque is less than a reference value.

10. The method of claim 9, wherein the calculating of a clutch input torque includes:
calculating, by the controller, an engine instruction torque using the engine target torque and the engine friction torque; and
calculating, by the controller, a clutch input torque using the engine instruction torque, the engine friction torque, the charge torque, and a pulley ratio.

11. The method of claim 9, wherein the clutch input torque is calculated using Equation 1.

$$Tci=(Teg+Tf)Tf+(Thc*P) \qquad \text{Equation 1}$$

wherein the Tci is a clutch input torque, Teg is an engine target torque, Tf is an engine friction torque, Thc is a charge torque, and P is a pulley ratio.

12. The method of claim 9, wherein the setting of at least one of an engine target torque and a charge torque includes:

determining, by the controller, whether the chargeable torque corresponds with a first predetermined value; and setting, by the controller, the engine target torque to a second predetermined value and setting the charge torque to the first predetermined value when the chargeable torque corresponds with a first predetermined value.

13. The method of claim 9, wherein the setting of at least one of an engine target torque and a charge torque includes:

determining, by the controller, whether the chargeable torque corresponds with a first predetermined value;

determining, by the controller, whether an engine target estimation torque is less than a calculation value generated using a chargeable torque and a pulley ratio when the chargeable torque does not correspond with a first predetermined value;

setting, by the controller, the engine target estimation torque to the engine target torque when an engine target estimation torque is less than a calculation value; and setting, by the controller, a charge torque using the engine target torque and a pulley ratio.

14. The method of claim 13, further comprising, after the determining of whether an engine target estimation torque is less than a calculation value:

setting, by the controller, an engine target torque using the chargeable torque and a pulley ratio when the engine target estimation torque is greater than or equal to the calculation value; and setting, by the controller, the chargeable torque to the charge torque.

15. The method of claim 9, wherein the determining of an engine target estimation torque includes:

determining, by the controller, an engine speed based on the generator rotation speed; and extracting, by the controller, an engine target estimation torque that corresponds to the engine speed in a predetermined table.

\* \* \* \* \*